(12) United States Patent
Ryu et al.

(10) Patent No.: US 11,472,445 B2
(45) Date of Patent: Oct. 18, 2022

(54) CRACK REPAIR MATERIAL OF CONCRETE VACUUM TUBE SEGMENT USING ULTRA-HIGH PERFORMANCE CONCRETE (UHPC) FOR HYPER-SPEED TRANSPORTATION SYSTEM, AND CRACK REPAIRING METHOD FOR THE SAME

(71) Applicant: KOREA INSTITUTE OF CIVIL ENGINEERING AND BUILDING TECHNOLOGY, Gyeonggi-Do (KR)

(72) Inventors: Gum Sung Ryu, Gyeonggi-do (KR); Byung Suk Kim, Gyeonggi-do (KR); Kyung Taek Koh, Gyeonggi-do (KR); Jae Joon Song, Seoul (KR); Jae Yoon Kang, Gyeonggi-do (KR); Jong Dae Baek, Gyeonggi-do (KR); Gi Hong An, Gyeonggi-do (KR)

(73) Assignee: KOREA INSTITUTE OF CIVIL ENGINEERING AND BUILDING TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 17/110,325

(22) Filed: Dec. 3, 2020

(65) Prior Publication Data
US 2022/0135088 A1 May 5, 2022

(30) Foreign Application Priority Data
Nov. 3, 2020 (KR) .................. 10-2020-0145573

(51) Int. Cl.
| | |
|---|---|
| *B61B 13/08* | (2006.01) |
| *C04B 14/38* | (2006.01) |
| *C09J 121/02* | (2006.01) |
| *E01B 25/30* | (2006.01) |
| *C04B 16/06* | (2006.01) |
| *C04B 111/72* | (2006.01) |

(52) U.S. Cl.
CPC ............ *B61B 13/08* (2013.01); *C04B 14/386* (2013.01); *C04B 16/0633* (2013.01); *C09J 121/02* (2013.01); *E01B 25/305* (2013.01); *C04B 2111/723* (2013.01)

(58) Field of Classification Search
CPC ... B61B 13/08; C04B 14/386; C04B 16/0633; C04B 2111/723; C09J 121/02; E01B 25/605; E01B 37/00
See application file for complete search history.

(56) References Cited

U.S. PATENT DOCUMENTS

| | | | |
|---|---|---|---|
| 9,528,286 B2 | 12/2016 | Wheatley | |
| 2018/0072624 A1* | 3/2018 | Dong | ...................... C04B 14/06 |

FOREIGN PATENT DOCUMENTS

| | | | |
|---|---|---|---|
| CN | 101629024 A | * | 1/2010 |
| KR | 100873514 | | 12/2008 |
| KR | 101751479 | | 6/2017 |
| KR | 101830638 | | 2/2018 |
| KR | 101853915 | | 5/2018 |
| KR | 102106353 | | 5/2020 |

* cited by examiner

*Primary Examiner* — Anthony J Green
(74) *Attorney, Agent, or Firm* — JCIPRNET

(57) ABSTRACT

The present invention provides a crack repair material of a concrete vacuum tube segment using ultra-high performance concrete (UHPC) for a hyper-speed transportation system and a crack repairing method for the same capable of, in a case in which a vacuum tube segment of a hyper-speed transportation system, such as the Hyperloop, is manufactured using UHPC, repairing cracks formed in the UHPC vacuum tube segment easily and conveniently using a crack growth prevention material and a patch repair material and capable of immediately repairing cracks formed in the UHPC vacuum tube segment to secure airtightness so that operation of a vacuum pump is minimized and overload of the vacuum pump is prevented.

10 Claims, 15 Drawing Sheets

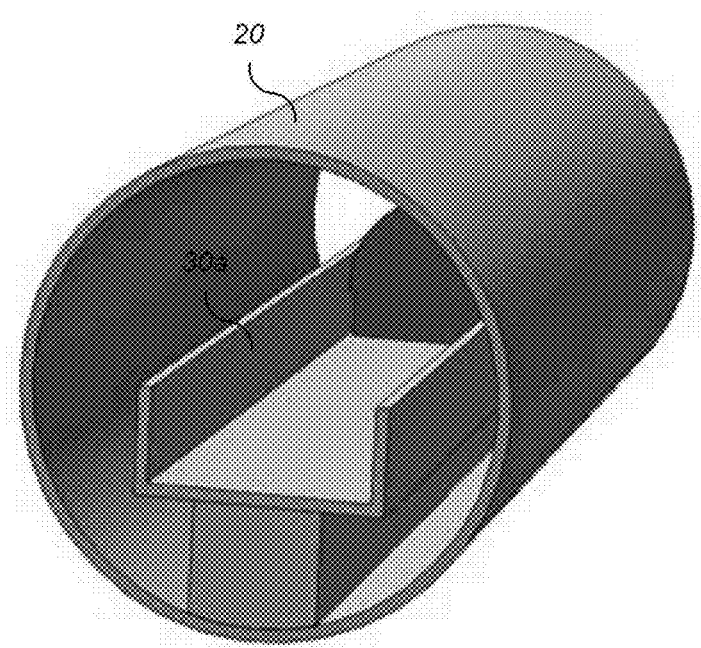
a)
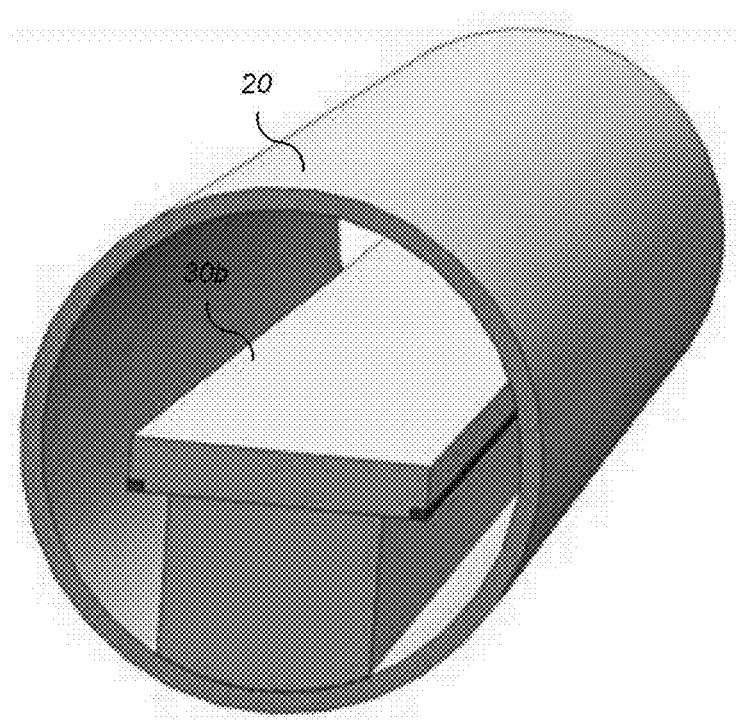
b)
FIG. 4

| CLASSIFICATION | | CEMENT COMPOSITE FOR UHPC CONCRETE VACUUM TUBE SEGMENT | |
|---|---|---|---|
| | | COMPOSITION RATIO (PARTS BY WEIGHT) | NOTES |
| BINDER (B) | CEMENT | 100 PARTS BY WEIGHT | |
| | SILICA FUME | 20 TO 30 PARTS BY WEIGHT | -SPECIFIC SURFACE AREA : 8,000~15,000 $cm^2/g$ |
| | QUARTZ POWDER | 15 TO 25 PARTS BY WEIGHT | - FILLER MATERIAL ($SiO_2$ 99%) -AVERAGE PARTICLE DIAMETER : 4um |
| FINE AGGREGATE | | 100 TO 120 PARTS BY WEIGHT | - QUARTZ SAND (SILICA SAND) - PARTICLE DIAMETER : 5 MM OR LESS |
| MIXING WATER(W) | | 20 TO 28 PARTS BY WEIGHT | - W/B : 0.2 OR LESS |
| HIGH-PERFORMANCE WATER REDUCING AGENT | | 4 TO 7 PARTS BY WEIGHT | - POLYCARBOXYLIC ACID-BASED |
| ANTIFOAMING AGENT | | 1.6 TO 2.2 PARTS BY WEIGHT | - FOAM REMOVING AGENT - MINIMIZE ENTRAPPED AIR (PORES) |
| SHORT FIBER | | - THE AMOUNT MIXED IS 1.5 TO 2% OF THE ENTIRE VOLUME OF CEMENT COMPOSITE - STEEL FIBER, GLASS FIBER, CARBON FIBER, ARAMID FIBER, BASALT FIBER | |

FIG. 6

CRACK REPAIR MATERIAL OF CONCRETE VACUUM TUBE SEGMENT USING ULTRA-HIGH PERFORMANCE CONCRETE (UHPC) FOR HYPER-SPEED TRANSPORTATION SYSTEM, AND CRACK REPAIRING METHOD FOR THE SAME

CROSS-REFERENCE TO RELATED APPLICATION

This application claims priority to and the benefit of Korean Patent Application No. 10-2020-0145573, filed on Nov. 3, 2020, the disclosure of which is incorporated herein by reference in its entirety.

BACKGROUND OF THE INVENTION

1. Technical Field

The present invention relates to crack repairing of a vacuum tube segment for a hyper-speed transportation system, and more particularly, to a crack repair material of a concrete vacuum tube segment using ultra-high performance concrete (UHPC) for a hyper-speed transportation system and a crack repairing method for the same capable of, in a case in which a vacuum tube segment of a hyper-speed transportation system, such as the Hyperloop, is manufactured using UHPC, repairing cracks formed in the UHPC vacuum tube segment.

2. Background of Related Art

Generally, a hyper-speed tube train is a tube railway system that travels while causing a sealed space, which is a tube, to be in a partial-vacuum state in order to overcome a limitation of the speed of the existing magnetic levitation train. The hyper-speed tube train may wrap a railroad track with a tube and then cause the tube to be in a vacuum or partial-vacuum state to minimize air resistance so that a higher speed is achieved with the same output. For example, the hyper-speed tube train may wrap the track with the tube and travel at 700 km/h or more while, for example, the tube is in a partial-vacuum state in which an atmospheric pressure is in a range of 0.05 to 0.4 atm.

While the existing magnetic levitation train has limitations due to air resistance and adhesive driving method and thus it is difficult for the train to travel at hyper speed, the hyper-speed tube train system forms a tube structure, maintains a partial-vacuum state in the tube structure to reduce air resistance, and uses a linear motor to realize non-adhesive driving so that hyper-speed traveling at 700 km/h or more is possible.

Since the hyper-speed tube train system maintains an interior of the tube in a vacuum or partial-vacuum state, a high-degree of aerodynamic design and precise control technology are required. For example, a diameter of the tube may be in a range of about 4.5 m to 10 m in the existing hyper-speed tube train. Cars of the hyper-speed tube train system are likely to be cars of a hyper-speed magnetic levitation train, and the hyper-speed tube train system has a structure in which the cars are supported with a magnetic force on a guideway and propelled by a linear motor while the cars maintain spaced apart at predetermined intervals.

Meanwhile, a hyper-speed transportation system, such as the Hyperloop, which is being developed recently, is a system in which a 3.2 m-diameter tunnel, which is formed to be close to a vacuum, is formed and a single 28-seater car of a train travels therein. In the Hyperloop hyper-speed transportation system, in theory, the maximum speed is 1223 km/h, which is about two times the maximum speed of a passenger plane that is about 780 km/h. The hyper-speed transportation system is directed to address problems due to urbanization, such as population concentration, traffic congestion, traffic accidents, and environmental pollution. The hyper-speed transportation system may be considered as a sustainable future transportation means in which a partial-vacuum transportation tube, which is in a vacuum or partial-vacuum state, is developed to minimize air resistance in the transportation system so that the transportation tube may travel at hyper speed.

Specifically, the Hyperloop hyper-speed transportation system is designed so that a magnet is attached to a lower portion of a train and a magnetic field flows through a bottom of a tunnel. Here, in order to minimize friction as much as possible, the train should travel while being slightly levitated. To this end, air remaining in the tunnel is suctioned and discharged to the bottom using a fan and a compressor, which are installed at the rear of the train, so that the train maintains a state of being levitated. Using such a method, for example, a 30-ton train is allowed to move at a speed of 1,200 km/h or more. Also, in order to supply electricity that is necessary to generate a magnetic field, a solar panel may be installed at an outer wall of the vacuum tunnel, and a wind power generator may be installed around the solar panel. Since the construction cost of the Hyperloop hyper-speed transportation system is only one tenth of that of high-speed railway, fares may be lowered.

FIG. 1 is a view for describing the Hyperloop hyper-speed transportation system, FIG. 2 is a view illustrating a passenger carrier in the Hyperloop hyper-speed transportation system illustrated in FIG. 1 in detail, and FIG. 3 is a view illustrating a vacuum tube segment in the Hyperloop hyper-speed transportation system illustrated in FIG. 1 in detail.

As illustrated in a) of FIG. 1, in the Hyperloop hyper-speed transportation system, a tube is installed between two stations and a vacuum pump is used to decrease an atmospheric pressure in the tube to be less than or equal to 0.1 atm to minimize air resistance so that a carrier is allowed to travel at the maximum speed of 1,200 km/h inside the partial-vacuum tube, which is close to a vacuum.

A carrier (10) of the Hyperloop hyper-speed transportation system resembles a train as illustrated in FIG. 2, but the actual operating method of the carrier (10) is very different from that of the existing train. Also, the Hyperloop hyper-speed transportation system is basically a transportation means having a form in which the carrier (10) is moved inside a vacuum tube (20). As illustrated in FIG. 3, a propelling force of the carrier (10) may be obtained using a magnetic field inside the vacuum tube (20), and air may be ejected to the bottom to reduce a frictional force. Here, necessary power is obtained from a solar panel that surrounds an outer wall of the vacuum tube (20).

Meanwhile, FIG. 4 is a view illustrating a tube structure for a hyper-speed tube railway according to the related art.

As illustrated in FIG. 4, the tube structure for the hyper-speed tube railway according to the related art is constructed so that tracks (30a, 30b) are each surrounded by closed circular tubes (20). A carrier in the form of a pod is allowed to travel at subsonic speed inside a tube having a circular cross-section that is configured by continuously joining steel pipes.

However, the tube structure for the hyper-speed tube railway according to the related art is a transportation tube made of steel material, and since a cross-sectional second moment is relatively small in a cross-section of a hollow circular tube (or transportation tube) as compared to an I-shaped or box-shaped cross-section, the shape is unfavorable in a bridge structure in which a flexural behavior is the main form of behavior, and a separate connecting material is required to induce synthesis between a circular steel pipe and a track structure.

In particular, in a case in which the tube (or transportation tube) needs to be replaced, there is a problem in that it is necessary to partially cut the entire steel pipe and track structure. Also, there are problems in that it is necessary to place a hoop-shaped reinforcing material to secure flexural stiffness of the hollow circular cross-section that is vulnerable to flexure, and since a span should be configured to be short in order to secure the flexural stiffness, the cost increases.

Meanwhile, the most in-demand performance in the partial-vacuum transportation tube for the hyper-speed transportation system is airtightness that allows $1/1000$ atm to be maintained. Conventionally, fundamental studies have been mostly carried out on steel materials, and there is still no case of manufacturing vacuum tubes for concrete structures based on cement.

Also, concrete with general strength can secure watertightness as in an immersed tunnel or the like, but it is very difficult and not economically feasible to secure airtightness in an environment in which the atmospheric pressure is $1/1000$ atm. In order to secure the airtightness, a cover thickness should be made large. It is difficult to secure airtightness for maintaining a single vacuum, and in order to secure the airtightness, a steel formwork with a thickness of about 10 mm should be placed outside concrete to maintain a very large cover thickness. Also, since general concrete does not have a self-compacting property, it is very difficult to manufacture in a circular shape, and since concrete pouring quality may be poor in some cross-sections, it is difficult to secure airtightness. Thus, there is a need for countermeasures.

In particular, it is known that, since the partial-vacuum transportation tube for the hyper-speed transportation system includes non-continuous sections such as construction joints and segment connecting parts, airtightness of the segment itself is also important, but airtightness of the connecting parts is more important in connecting the segments.

In the case of the vacuum tube for the concrete structure, since an air permeability of the concrete itself tends to be inversely proportional to strength and an equivalent air permeability of the structure tends to increase with an increased number of joint parts, for example, it was found that it took about 4 to 5 hours for an internal atmospheric pressure of an integrated-type concrete tube to double from 10 kPa, which was an initial value, to 20 kPa. This shows that it is difficult to maintain the partial-vacuum state in the tube using general concrete, and thus a material having better airtightness is necessary. For example, ultra-high performance concrete (UHPC) may be an alternative to general concrete, but so far, there is no partial-vacuum transportation tube for hyper-speed transportation system that uses the UHPC. Also, the hyper-speed transportation system using the vacuum tube has not been realized yet, and only the concept thereof has been proposed, or research is in progress.

Meanwhile, as the related art of the above-described UHPC, "Ultra-high performance fiber-reinforced concrete and manufacturing method of the same" has been disclosed in Korean Patent Registration No. 10-1751479 that has been filed by the applicant of the present invention and registered. Since a mix proportion of the ultra-high performance fiber-reinforced concrete is designed on the basis of a maximum fill theory as well as dynamic performance and durability in which a compressive strength is in a range of 80 to 180 MPa, a flexural strength is 15 MPa or higher, a direct tensile strength is 7 MPa or higher, a service life is 100 to 200 years, and a shrinkage strain is 700 or lower, it is possible to implement ultra-high performance fiber-reinforced concrete in which the structure inside the concrete is very dense so that watertightness and airtightness are excellent. The ultra-high performance fiber-reinforced concrete and manufacturing method of the same are referenced herein and constitute part of the present invention.

Meanwhile, FIG. 5 is a picture showing through-wall cracks that may be formed when using the UHPC according to the related art.

However, in the UHPC, as illustrated in FIG. 5, through-wall cracks may be formed due to various reasons such as shrinkage. For example, in the UHPC, through-wall cracks may be formed due to autogenous shrinkage because, while drying shrinkage is very small due to a low water-to-binder ratio and use of a large amount of cement, the autogenous shrinkage is very large. When the through-wall cracks are formed, there is a problem in that it may be difficult to secure airtightness when installing a vacuum tube segment for a hyper-speed transportation system. Also, since, when cracks are formed in a concrete surface, it is very difficult to secure airtightness in a hyper-speed transportation system environment, in which an atmospheric pressure is $1/1000$ atm, and a vacuum pump has to be operated continuously to secure the airtightness, there is a problem in that the service life of vacuum pump equipment may be shortened due to overload.

RELATED ART DOCUMENTS

Patent Documents (Patent Document 0001) Korean Patent Registration No. 10-2106353 (Date of Registration: Apr. 24, 2020), Title of Invention: "Ultra-high-strength resin mortar composition and construction method of underwater structure and hyperloop tube using the same"

(Patent Document 0002) Korean Patent Registration No. 10-1751479 (Date of Registration: Jun. 21, 2017), Title of Invention: "Ultra-high performance fiber-reinforced concrete and manufacturing method of the same"

(Patent Document 0003) Korean Patent Registration No. 10-1830638 (Date of Registration: Feb. 13, 2018), Title of Invention: "Tube structure for integrating tube shield into concrete slab structure for super-speed tube railway, and construction for the same"

(Patent Document 0004) Korean Patent Registration No. 10-1853915 (Date of Registration: Apr. 25, 2018), Title of Invention: "Tabular structure of slab-canopy composite modular type for hyper-speed tube railway, and construction method for the same"

(Patent Document 0005) Korean Patent Registration No. 10-0873514 (Date of Registration: Dec. 4, 2008), Title of Invention: "Binder for concrete having ultra-high strength and a method for manufacturing concrete using the binder"

SUMMARY OF THE INVENTION

The present invention is directed to providing a crack repair material of a concrete vacuum tube segment using ultra-high performance concrete (UHPC) for a hyper-speed transportation system and a crack repairing method for the same capable of, in a case in which a vacuum tube segment of a hyper-speed transportation system, such as the Hyperloop, is manufactured using UHPC, using a crack growth prevention material and a patch repair material to repair cracks formed in the UHPC vacuum tube segment.

The present invention is also directed to providing a crack repair material of a concrete vacuum tube segment using UHPC for a hyper-speed transportation system and a crack repairing method for the same capable of immediately repairing cracks formed in the UHPC vacuum tube segment to secure airtightness so that overload of a vacuum pump is prevented.

The present invention provides a crack repair material of a concrete vacuum tube segment using ultra-high performance concrete (UHPC) for a hyper-speed transportation system, which is a crack repair material for, in a case in which a vacuum tube segment for a hyper-speed transportation system is formed using UHPC, repairing cracks formed in the UHPC vacuum tube segment, the crack repair material including a crack growth prevention material that is inserted into a crack part of a UHPC vacuum tube segment in a direction perpendicular thereto to prevent growth of the crack, and a patch repair material that includes a textile reinforcement material, an adhesive, and a capsule-type crack healing material and is attached to the crack part of the UHPC vacuum tube segment, wherein, when the patch repair material attached to the crack part of the UHPC vacuum tube segment allows a vacuum pump installed for the hyper-speed transportation system to operate, a pressure is generated inside the UHPC vacuum tube segment, and the adhesive and the capsule-type crack healing material fill the crack according to vacuum pressure to repair the crack in the UHPC vacuum tube segment.

Here, the crack growth prevention material may be a carbon fiber textile.

Here, the textile reinforcement material of the patch repair material may be a 3D coil textile made of a polypropylene material.

Here, the adhesive of the patch repair material may be an adhesive made of a latex material.

Here, the capsule-type crack healing material of the patch repair material may include a microcapsule and a polymer matrix, and a microcapsule that has methacrylate as a core material and poly(urea-formaldehyde) as a capsule film-forming material may be added into the polymer matrix.

Here, when fine cracks are formed and propagate in a concrete surface, in the capsule-type crack healing material, the microcapsule placed at a position where the cracks propagate may be broken so that a monomer therein flows between crack faces, and the monomer which penetrates into the cracks may cause a polymerization reaction due to light so that the cracks self-heal.

The present invention provides a method of repairing cracks in a concrete vacuum tube segment using ultra-high performance concrete (UHPC) for a hyper-speed transportation system, which is a method for, in a case in which a vacuum tube segment for a hyper-speed transportation system is formed using UHPC, repairing cracks formed in the UHPC vacuum tube segment, the method including: a) identifying a crack formed in the UHPC vacuum tube segment for the hyper-speed transportation system; b) inserting a crack growth prevention material into a crack part of the UHPC vacuum tube segment in a direction perpendicular thereto to prevent growth of the crack; c) attaching a patch repair material, which includes a textile reinforcement material, an adhesive, and a capsule-type crack healing material, to the crack part in the UHPC vacuum tube segment; d) operating a vacuum pump that causes an interior of the UHPC vacuum tube segment to be in a vacuum or partial-vacuum state; and e) according to vacuum pressure caused by the vacuum pump, repairing the crack by filling the crack part with the adhesive and the capsule-type crack healing material of the patch repair material.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a view illustrating a tube structure for a hyper-speed tube railway according to the related art;

FIG. 6 is a view illustrating composition of ultra-high performance concrete (UHPC) in a concrete vacuum tube segment using UHPC for a hyper-speed transportation system according to an embodiment of the present invention;

DETAILED DESCRIPTION OF EXEMPLARY EMBODIMENTS

Figure 1:
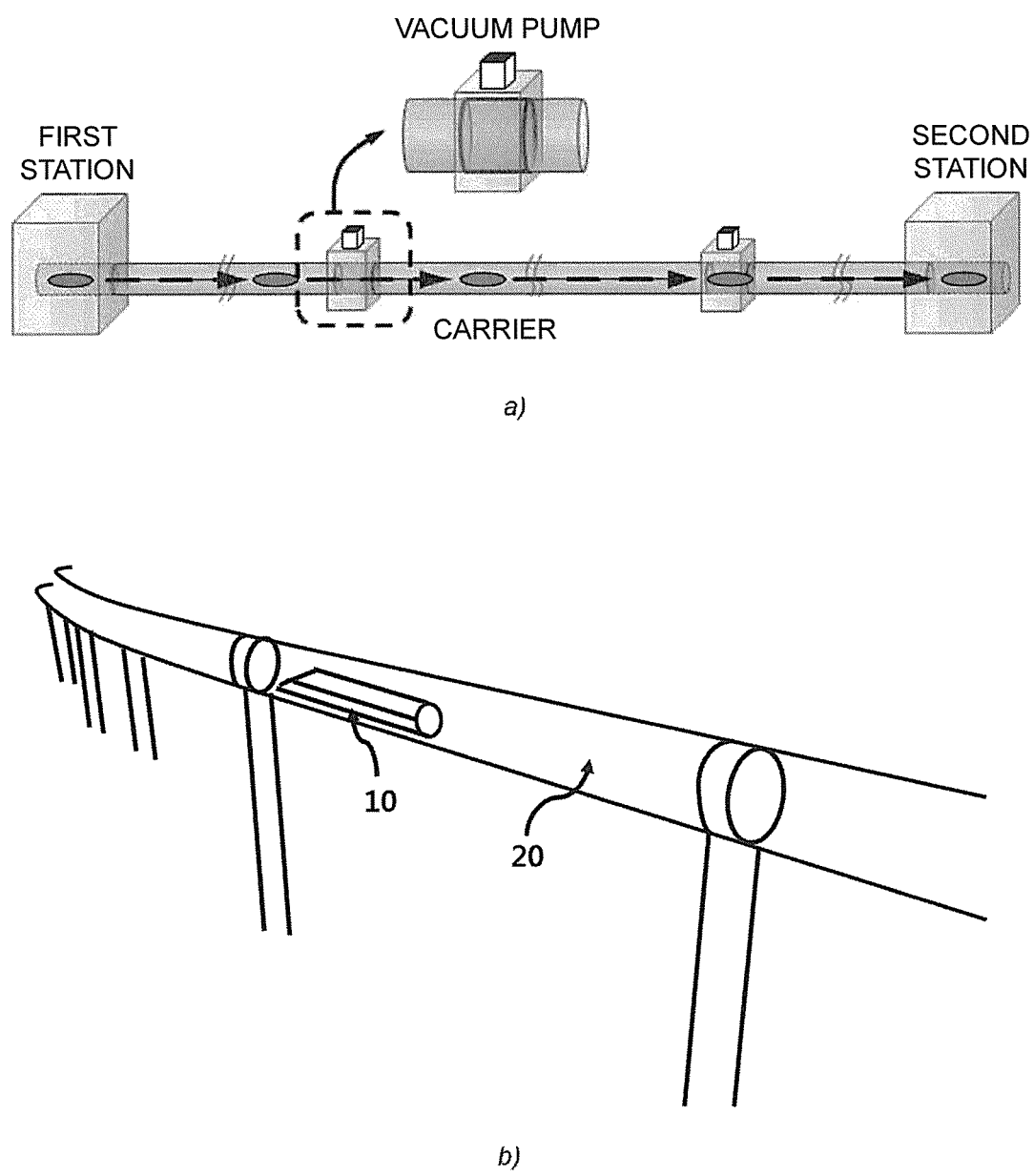
FIG. 1 is a view for describing a Hyperloop hyper-speed transportation system.
Figure 2:
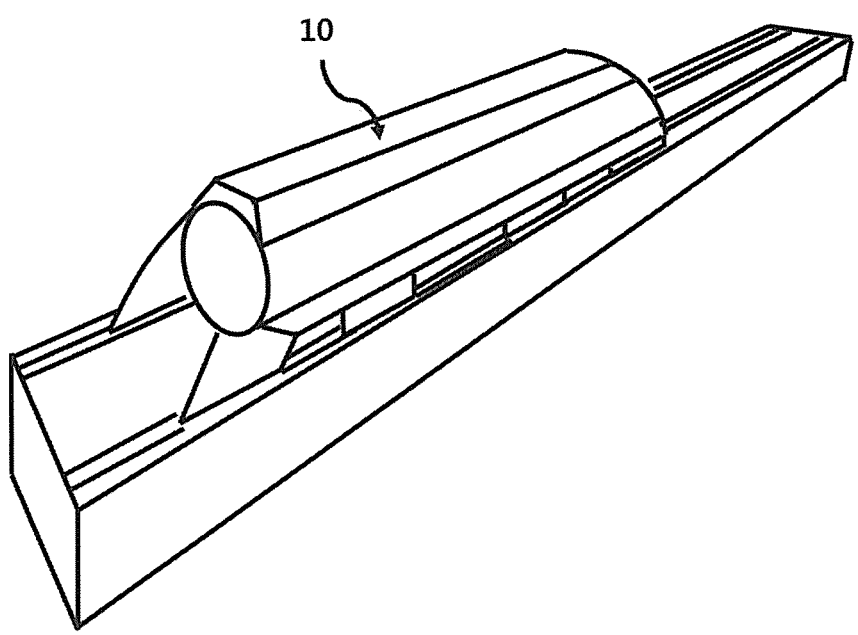
FIG. 2 is a view illustrating a passenger carrier in the Hyperloop hyper-speed transportation system illustrated in FIG. 1 in detail.
Figure 3:
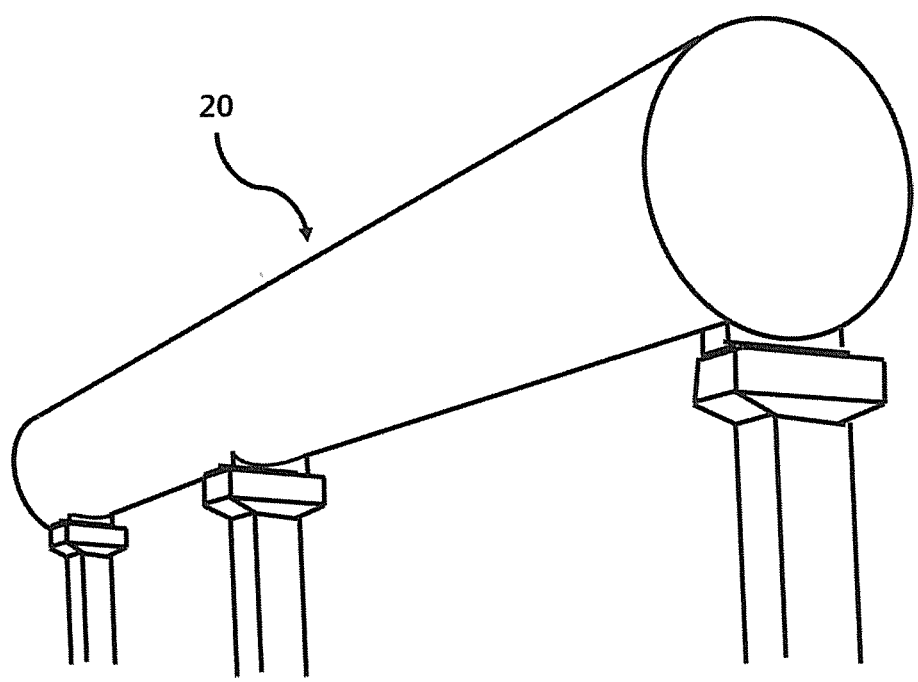
FIG. 3 is a view illustrating a vacuum tube segment in the Hyperloop hyper-speed transportation system illustrated in FIG. 1 in detail.
Figure 5:
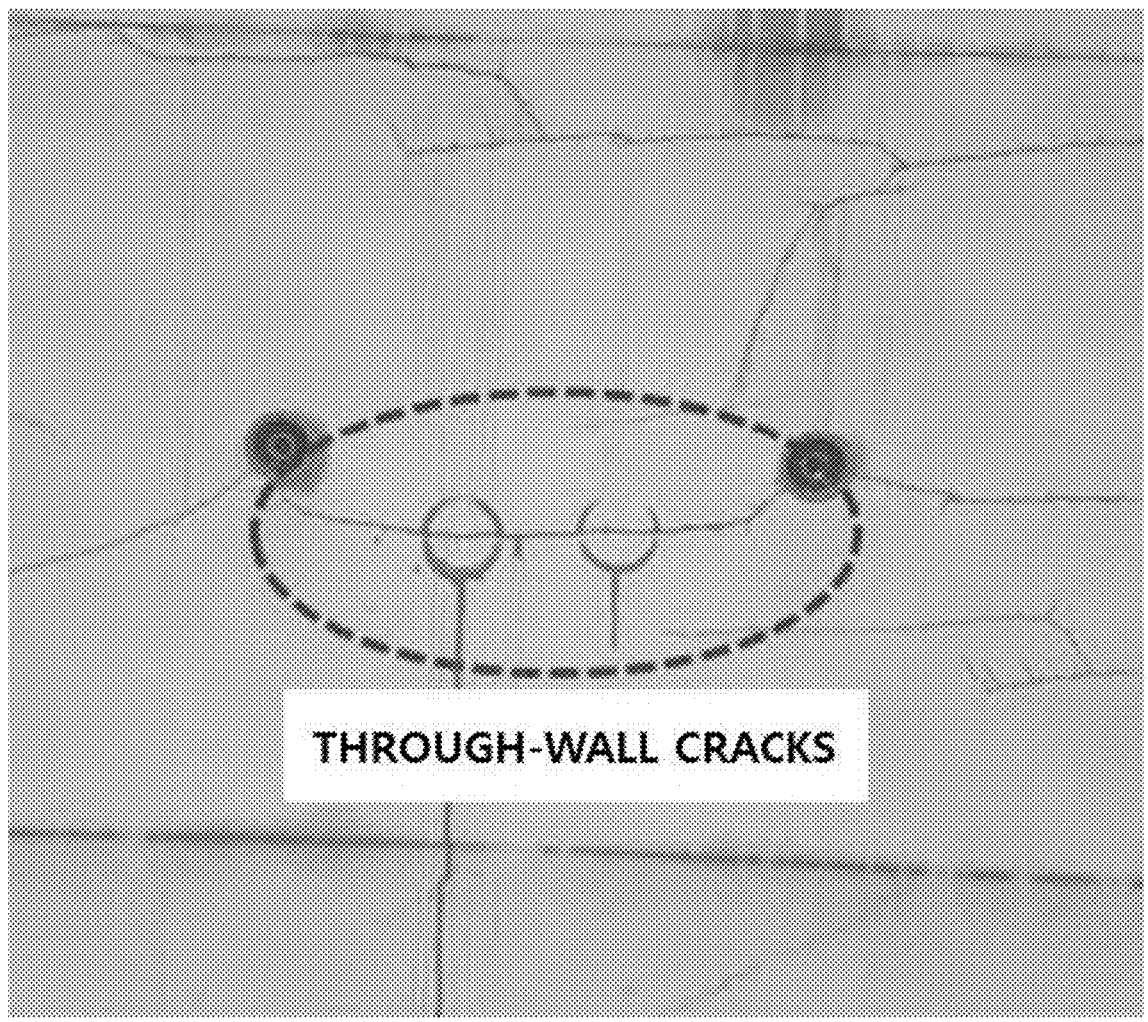
FIG. 5 is a picture showing through-wall cracks that may be formed when using the UHPC according to the related art.

Hereinafter, embodiments of the present invention will be described in detail with reference to the accompanying drawings to allow those of ordinary skill in the art to which the present invention pertains to easily practice the present invention. However, the present invention may be implemented in various different forms and is not limited by the embodiments described herein. Also, in order to clearly describe the present invention, parts unrelated to the description have been omitted from the drawings, and similar parts will be denoted by like reference numerals throughout the specification.

Throughout the specification, when a certain part is described as "including" a certain element, this indicates that the certain part may further include another element instead of excluding another element unless the context clearly indicates otherwise.

First, in relation to a hyper-speed transportation system, it is necessary to maintain a partial-vacuum state, in which an atmospheric pressure is about 0.1 atm, to allow propulsion at a speed of 700 km/h or more. Here, a steel material, other alloys, ultra-high performance concrete (UHPC), or the like may be considered as a material of a partial-vacuum tube, but among the above, the UHPC has a dense structure and thus is not only able to implement a partial-vacuum tube of 0.1 atm at a thickness of less than or equal to 30 cm, but also able to allow vacuum pumps, which are for maintaining the partial-vacuum tube, to be arranged at intervals that are economically feasible. Therefore, a concrete vacuum tube segment for a hyper-speed transportation system according to an embodiment of the present invention is manufactured using the UHPC.

[Concrete Vacuum Tube Segment Using UHPC for Hyper-Speed Transportation System]

FIG. 6 is a view illustrating composition of UHPC in a concrete vacuum tube segment using UHPC for a hyper-speed transportation system according to an embodiment of the present invention.

In the UHPC vacuum tube segment for the hyper-speed transportation system according to the embodiment of the present invention, as illustrated in FIG. 6, the UHPC may include 100 parts by weight of cement as a binder B, 20 to 30 parts by weight of silica fume as the binder B, 15 to 25 parts by weight of quartz powder as the binder B, 100 to 120 parts by weight of fine aggregate, 20 to 28 parts by weight of mixing water W, 4 to 7 parts by weight of a high-performance water reducing agent, and 1.6 to 2.2 parts by weight of an antifoaming agent, wherein the UHPC is mixed with a short fiber to form a cement composite, and a volume of the mixed short fiber is 1.5 to 2% of the entire volume of the cement composite. Accordingly, the concrete vacuum tube segment may be formed as a vacuum tube segment for a hyper-speed transportation system.

Specifically, the silica fume may have a specific surface area in a range of 8,000 to 15,000 $cm^2/g$, but the present invention is not limited thereto.

The quartz powder may be a filler material containing 99% silicon dioxide ($SiO_2$) and may have an average particle diameter of 4 μm, but the present invention is not limited thereto.

The fine aggregate may be silica sand, which is quartz sand, and may have a particle diameter of less than or equal to 5 mm, but the present invention is not limited thereto.

A ratio W/B of the mixing water W to the binder B may be 0.2 to implement the UHPC.

The antifoaming agent may minimize entrapped air that is generated inside the UHPC due to high viscosity of the UHPC when mixing the UHPC. Specifically, airtightness of the UHPC may be improved using the antifoaming agent.

The short fiber may be selected from the group consisting of a steel fiber, a glass fiber, a carbon fiber, an aramid fiber, and a basalt fiber and may have a length of less than or equal to 20 mm, but the present invention is not limited thereto.

In the case of the UHPC vacuum tube segment for the hyper-speed transportation system according to the embodiment of the present invention, since a cement composite is formed using the UHPC, and a mix proportion of the cement composite is designed on the basis of a maximum fill theory as well as dynamic performance and durability in which a compressive strength is in a range of 80 to 180 MPa, a flexural strength is 15 MPa or higher, a direct tensile strength is 7 MPa or higher, a service life is 100 to 200 years, and a shrinkage strain is 700 or lower, the structure inside the concrete is very dense, and watertightness and airtightness are excellent.

Figure 7:
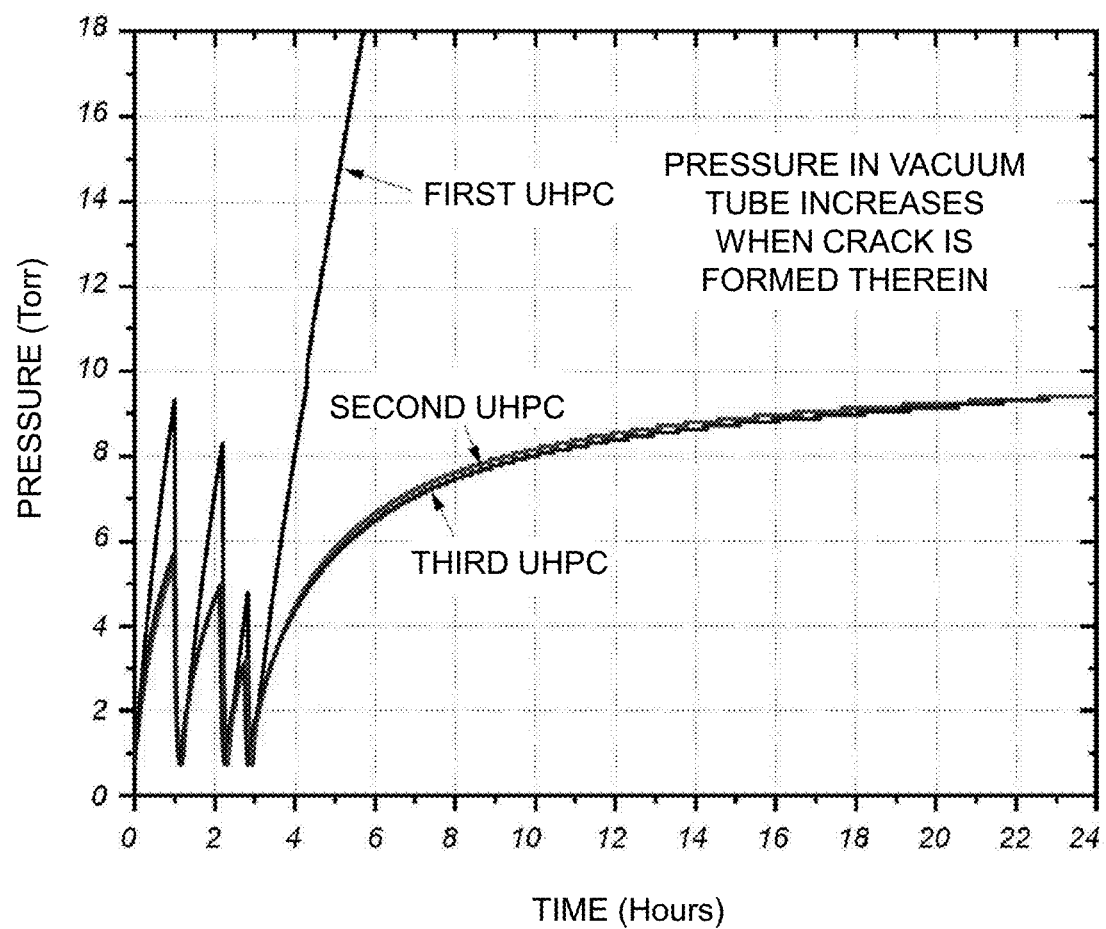
FIG. 7 is a view illustrating airtightness of the UHPC with relation to cracks in the UHPC vacuum tube segment for the hyper-speed transportation system according to an embodiment of the present invention.

Meanwhile, FIG. 7 is a view illustrating airtightness of the UHPC with relation to cracks in the UHPC vacuum tube segment for the hyper-speed transportation system according to an embodiment of the present invention.

In the UHPC vacuum tube segment for the hyper-speed transportation system according to the embodiment of the present invention, as illustrated in FIG. 7, a pressure in the UHPC vacuum tube segment increases when a crack is formed in a first UHPC. Accordingly, it becomes difficult to maintain an interior of the UHPC vacuum tube segment in a vacuum or partial-vacuum state. Accordingly, the crack formed in the UHPC vacuum tube segment should be repaired.

Hereinafter, a crack repair material of the UHPC vacuum tube segment for the hyper-speed transportation system according to an embodiment of the present invention will be described with reference to FIGS. 8 to 11, and a method of repairing cracks in the UHPC vacuum tube segment for the hyper-speed transportation system according to an embodiment of the present invention will be described with reference to FIG. 12 and FIGS. 13A to 13D.

[Crack Repair Material of Concrete Vacuum Tube Segment Using UHPC for Hyper-Speed Transportation System]

Figure 8:
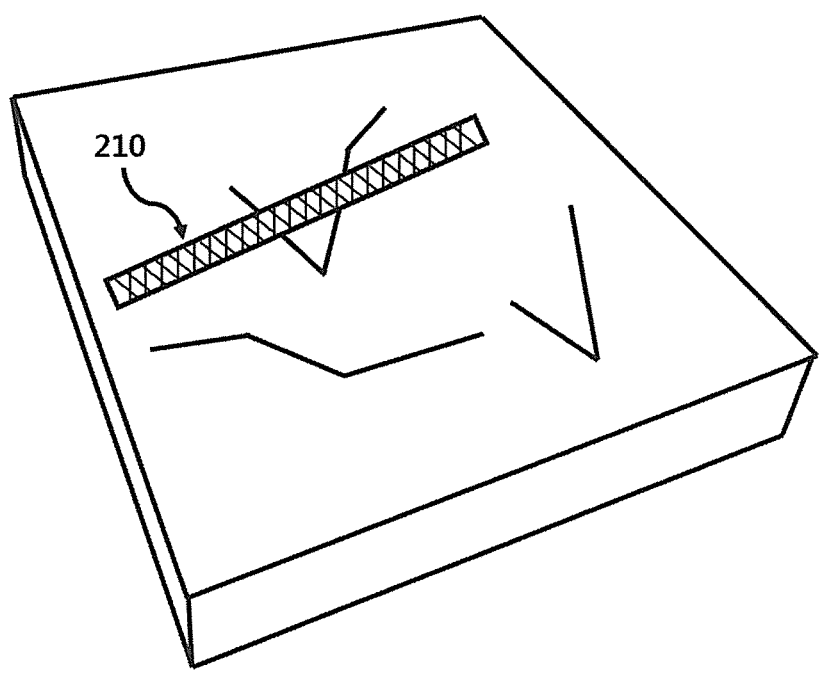
FIG. 8 is a picture showing a carbon fiber textile, which is attached to prevent growth of a crack, of a crack repair material of the UHPC vacuum tube segment for the hyper-speed transportation system according to an embodiment of the present invention.
Figure 9:
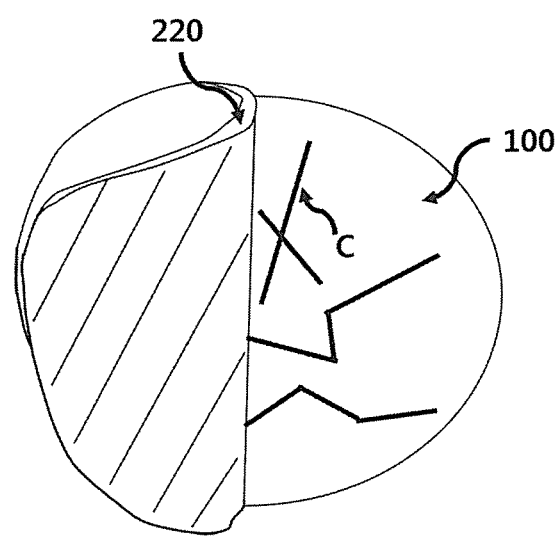
FIG. 9 is a view illustrating a patch repair material of the crack repair material of the UHPC vacuum tube segment for the hyper-speed transportation system according to an embodiment of the present invention.
Figure 10:
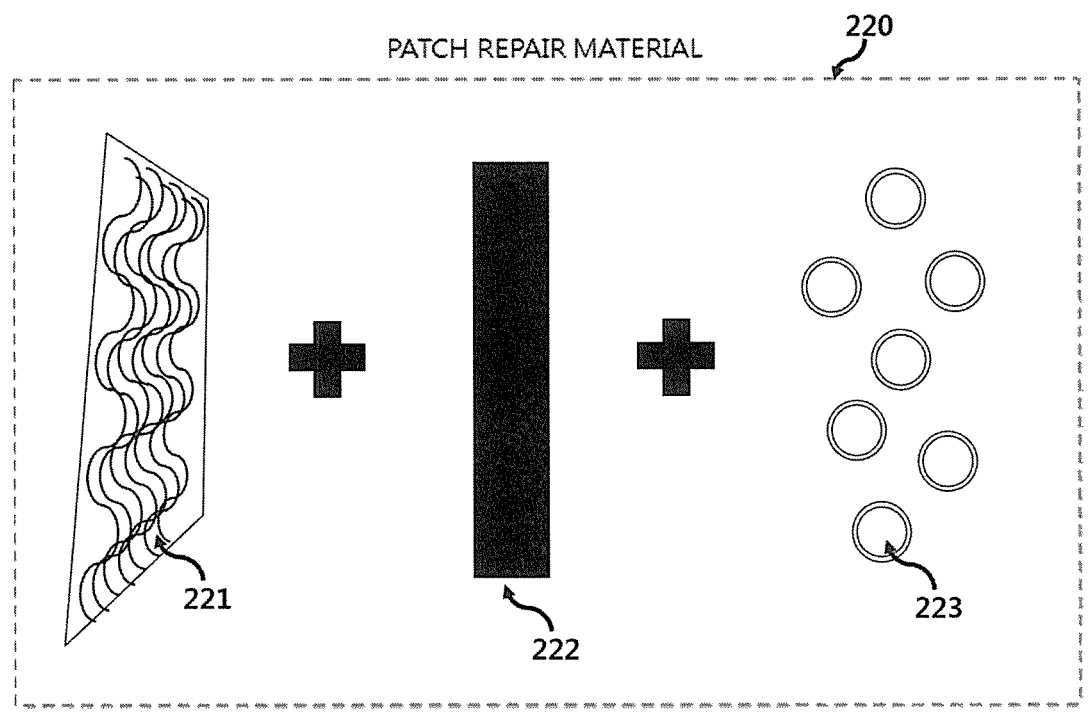
FIG. 10 is a view illustrating elements of the patch repair material of the crack repair material of the UHPC vacuum tube segment for the hyper-speed transportation system according to an embodiment of the present invention.

As illustrated in FIGS. 8 to 10, a crack repair material of a concrete vacuum tube segment using UHPC for a hyper-speed transportation system according to an embodiment of the present invention, which is a crack repair material for, in a case in which a vacuum tube segment for a hyper-speed transportation system is formed using UHPC, repairing cracks formed in the UHPC vacuum tube segment, includes a crack growth prevention material 210 and a patch repair material 220, and the patch repair material 220 includes a textile reinforcement material 221, an adhesive 222, and a capsule-type crack healing material 223.

FIG. 8 is a picture showing a carbon fiber textile, which is attached to prevent growth of a crack, of a crack repair material of the UHPC vacuum tube segment for the hyper-speed transportation system according to an embodiment of the present invention.

As illustrated in FIG. 8, in the crack repair material of the UHPC vacuum tube segment for the hyper-speed transportation system according to the embodiment of the present invention, the crack growth prevention material 210 is inserted into a crack part C in a UHPC vacuum tube segment 100 in a direction perpendicular thereto to prevent growth of the crack. Here, preferably, the crack growth prevention material 210 is a carbon fiber textile, but the present invention is not limited thereto.

That is, in order to prevent further growth of the crack in the UHPC vacuum tube segment for the hyper-speed transportation system and secure airtightness, a carbon fiber textile, which serves as the crack growth prevention material 210, is inserted into the crack in a direction perpendicular thereto to prevent further growth of the crack, and then, the patch repair material 220 is attached to repair the crack.

Meanwhile, FIG. 9 is a view illustrating a patch repair material of the crack repair material of the UHPC vacuum tube segment for the hyper-speed transportation system according to an embodiment of the present invention, and FIG. 10 is a view illustrating elements of the patch repair material of the crack repair material of the UHPC vacuum tube segment for the hyper-speed transportation system according to an embodiment of the present invention.

As illustrated in FIGS. 9 and 10, in the crack repair material of the UHPC vacuum tube segment for the hyper-speed transportation system according to the embodiment of the present invention, the patch repair material 220 includes the textile reinforcement material 221, the adhesive 222, and the capsule-type crack healing material 223 and is attached to the crack part C in the UHPC vacuum tube segment 100.

Accordingly, the patch repair material 220 attached to the crack part in the UHPC vacuum tube segment allows a vacuum pump 300 installed for the hyper-speed transportation system to operate. Here, for the hyper-speed transportation system to which the UHPC vacuum tube segment is connected, the vacuum pump 300 may be provided as a plurality of vacuum pumps 300 installed at predetermined intervals between stations to form a vacuum or partial vacuum inside the UHPC vacuum tube segment.

Accordingly, a pressure is generated inside the UHPC vacuum tube segment 100, and the adhesive 222 and the capsule-type crack healing material 223 fill the crack according to vacuum pressure to repair the crack in the UHPC vacuum tube segment 100.

The textile reinforcement material 221 of the patch repair material 220 may be a 3D coil textile made of a polypropylene material, but the present invention is not limited thereto.

The adhesive 222 of the patch repair material 220 may be an adhesive made of a latex material, but the present invention is not limited thereto.

The capsule-type crack healing material 223 of the patch repair material 220 may include a microcapsule and a polymer matrix, and a microcapsule that has methacrylate as a core material and poly(urea-formaldehyde) as a capsule film-forming material may be added into the polymer matrix. Here, when fine cracks are formed and propagate in a concrete surface, in the capsule-type crack healing material 223, the microcapsule placed at a position where the cracks propagate may be broken so that a monomer therein flows between crack faces, and the monomer which penetrates into the cracks may cause a polymerization reaction due to light so that the cracks self-heal.

More specifically, as a method of imparting self-healing ability to a material, there is a self-healing method using addition of a microcapsule containing a self-healing agent. Research on self-healing using microcapsules has mostly been carried out in the field of polymers and synthetic materials and has recently been applied to self-healing of cracks of concrete. The self-healing method using microcapsules is a method in which microcapsules, each containing a polymeric monomer therein as a core material, are manufactured and distributed inside concrete. The method is a concept in which, when cracks are formed in the concrete, the microcapsules are broken so that the monomers therein flow between crack faces, and the monomers which penetrate into the cracks cause a polymerization reaction due to a catalyst so that the cracks self-heal.

However, since such methods use a catalyst in a polymer matrix, there is a problem in terms of economic feasibility, and the process becomes complicated due to requiring a uniform distribution process for the catalyst. Also, there is a disadvantage in that physical properties of formed materials are not constant according to the amount of mixed catalyst and the degree of distribution of the catalyst, and there are many limitations such as the possibility of deterioration of the catalyst during long-term storage. Therefore, the self-healing agent, which may react due to light without using a catalyst, may be formed into microcapsules to allow self-healing of cracks in concrete surfaces.

That is, microcapsules each having methacrylate as a core material and poly(urea-formaldehyde) as a capsule film-forming material may be added into a polymer matrix and coated on a concrete surface, and in this way, when fine cracks are formed and propagate in the concrete surface, the microcapsules placed at positions where the cracks propagate are broken so that the monomers therein flow between crack faces, and the monomers which penetrate into the cracks cause a polymerization reaction due to light so that the cracks self-heal. The self-healing performance may be evaluated using experiments on water absorbability and water permeability and observation through an optical microscope. As a result, the proposed self-healing system may be used to partially repair cracks in concrete.

Figure 11:
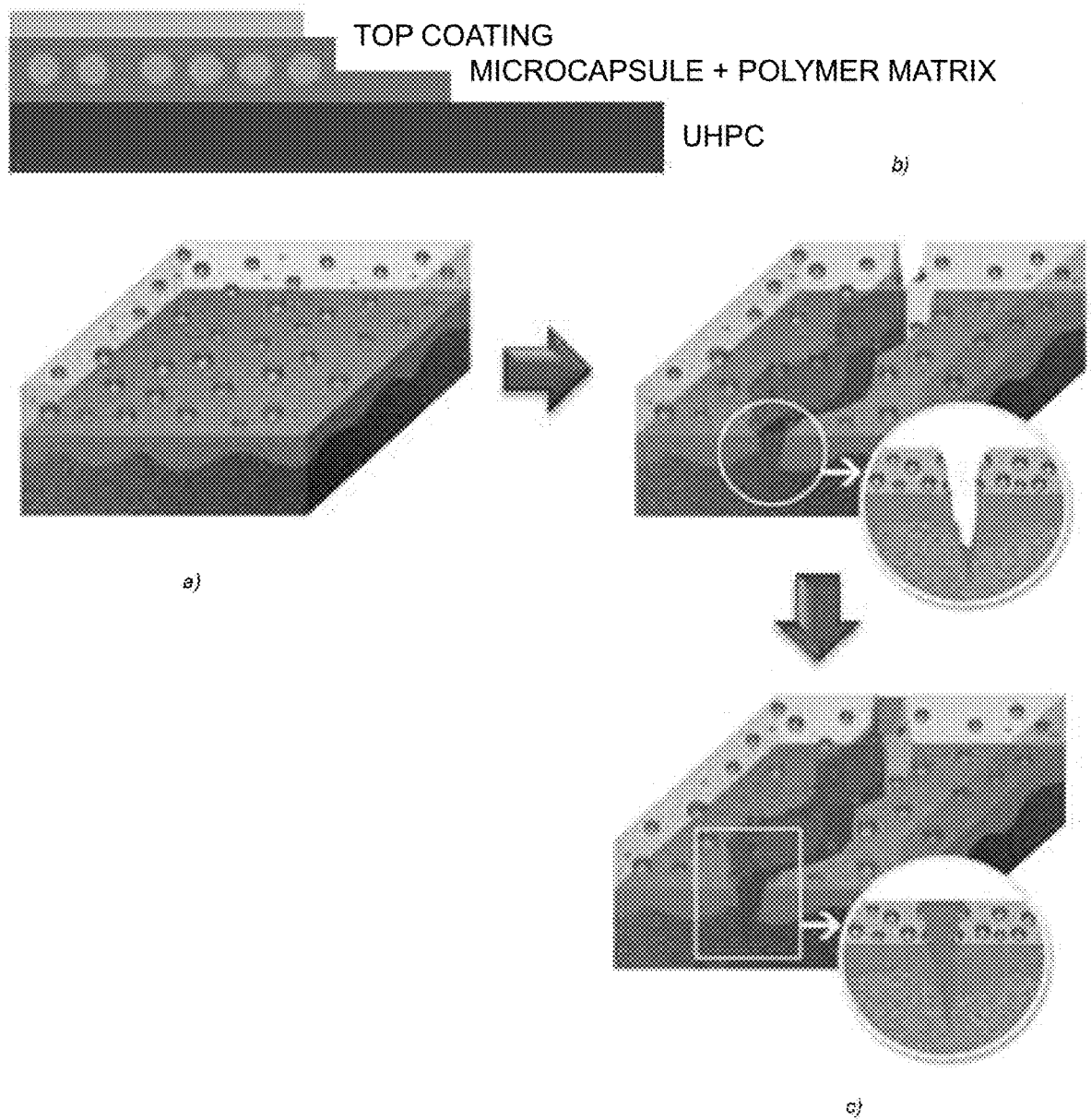
FIG. 11 is a view for describing a capsule-type crack healing material of the patch repair material illustrated in FIG. 10 in detail.

FIG. 11 is a view for describing a capsule-type crack healing material of the patch repair material illustrated in FIG. 10 in detail.

The structure of the self-healing system and the concept of self-healing using microcapsules when cracks are formed in the UHPC vacuum tube segment for the hyper-speed transportation system according to the embodiment of the present invention are illustrated in FIG. 11. Specifically, the structure is a structure in which a polymer matrix is used as a primer and an intermediate coating material on a concrete surface and microcapsules containing a self-healing agent are mixed with the polymer matrix. Also, a top coating material is applied on the top layer to form a double coating structure. Then, when a crack is formed in the concrete, the polymer matrix mixed with the microcapsules is broken and the self-healing agent in the microcapsules flows out and causes a polymerization reaction due to light to form a siloxane structure and fill the crack part.

Consequently, in a case in which a vacuum tube segment of a hyper-speed transportation system, such as the Hyperloop, is manufactured using UHPC, growth of cracks in the UHPC vacuum tube segment for the hyper-speed transportation system according to the embodiment of the present invention may be prevented using the crack growth prevention material, and then the cracks formed in the UHPC vacuum tube segment may be repaired easily and conveniently using the patch repair material.

[Method of Repairing Cracks in Concrete Vacuum Tube Segment Using UHPC for Hyper-Speed Transportation System]

Figure 12:
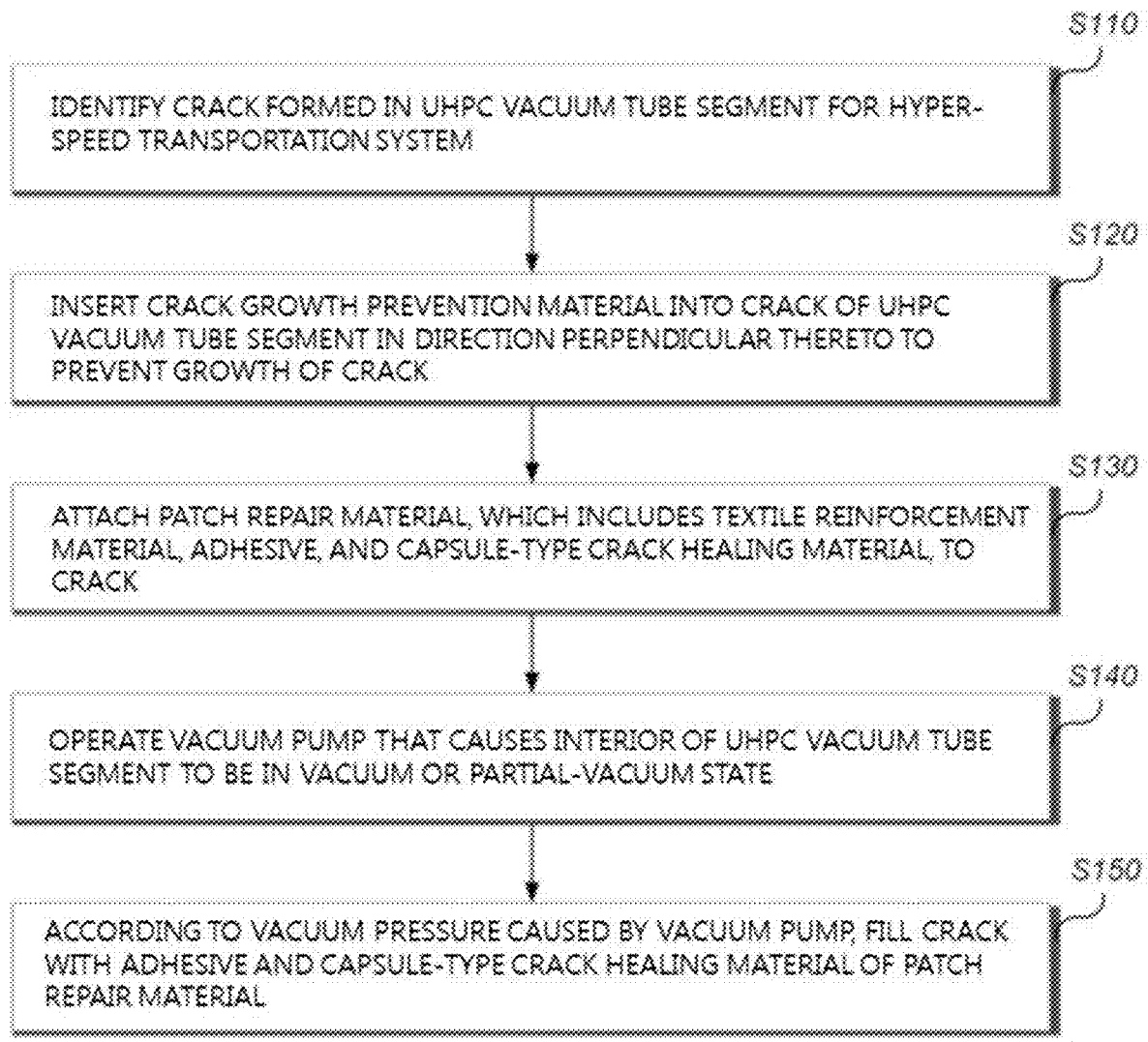
FIG. 12 is an operational flowchart showing a method of repairing cracks in a concrete vacuum tube segment using UHPC for a hyper-speed transportation system according to an embodiment of the present invention.

FIG. 12 is an operational flowchart showing a method of repairing cracks in a concrete vacuum tube segment using UHPC for a hyper-speed transportation system according to an embodiment of the present invention, and FIGS. 13A to 13D are views for describing the method of repairing cracks in the UHPC vacuum tube segment for the hyper-speed transportation system according to an embodiment of the present invention in detail.

Figure 13A:
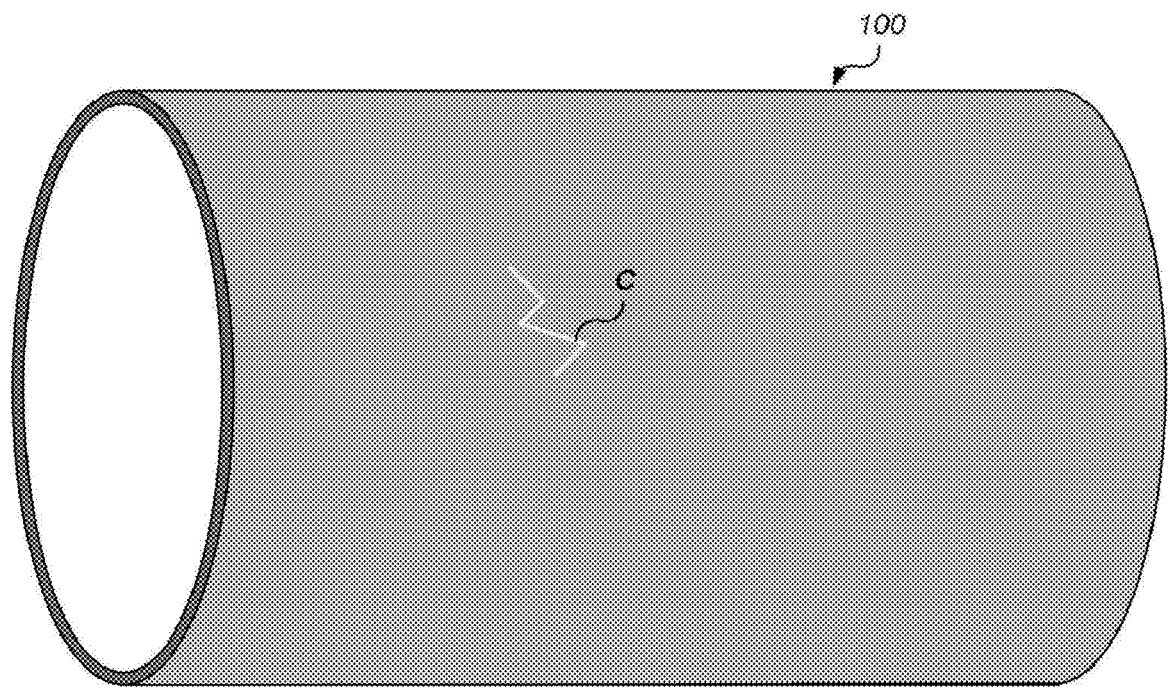
FIGS. 13a to 13d are views for describing the method of repairing cracks in the UHPC vacuum tube segment for the hyper-speed transportation system according to an embodiment of the present invention in detail.

Referring to FIG. 12 and FIGS. 13a to 13d, a method of repairing cracks in a concrete vacuum tube segment using UHPC for a hyper-speed transportation system according to an embodiment of the present invention is a method for, in a case in which a vacuum tube segment for a hyper-speed transportation system is formed using UHPC, repairing cracks formed in the UHPC vacuum tube segment. In the method, as illustrated in FIG. 13a, first, a crack C formed in the UHPC vacuum tube segment 100 for the hyper-speed transportation system is identified (S110). Here, the UHPC forming the UHPC vacuum tube segment 100 may include 100 parts by weight of cement as a binder B, 20 to 30 parts by weight of silica fume as the binder B, 15 to 25 parts by weight of quartz powder as the binder B, 100 to 120 parts by weight of fine aggregate, 20 to 28 parts by weight of mixing water W, 4 to 7 parts by weight of a high-performance water reducing agent, and 1.6 to 2.2 parts by weight of an antifoaming agent, wherein the UHPC is mixed with a short fiber to form a cement composite, and a volume of the mixed short fiber is 1.5 to 2% of the entire volume of the cement composite. Accordingly, the cement composite may have a compressive strength in a range of 80 to 180 MPa, a flexural strength of 15 MPa or higher, a direct tensile strength of 7 MPa or higher, a service life of 100 to 200 years, and a shrinkage strain of 700 or lower. However, as described above, through-wall cracks may be formed due to autogenous shrinkage because, while drying shrinkage is very small due to a low water-to-binder ratio and use of a large amount of cement, the autogenous shrinkage is very large. When the through-wall cracks are formed, it may be difficult to secure airtightness when installing the vacuum tube segment 100 for the hyper-speed transportation system. Therefore, the cracks should be repaired.

Figure 13B:
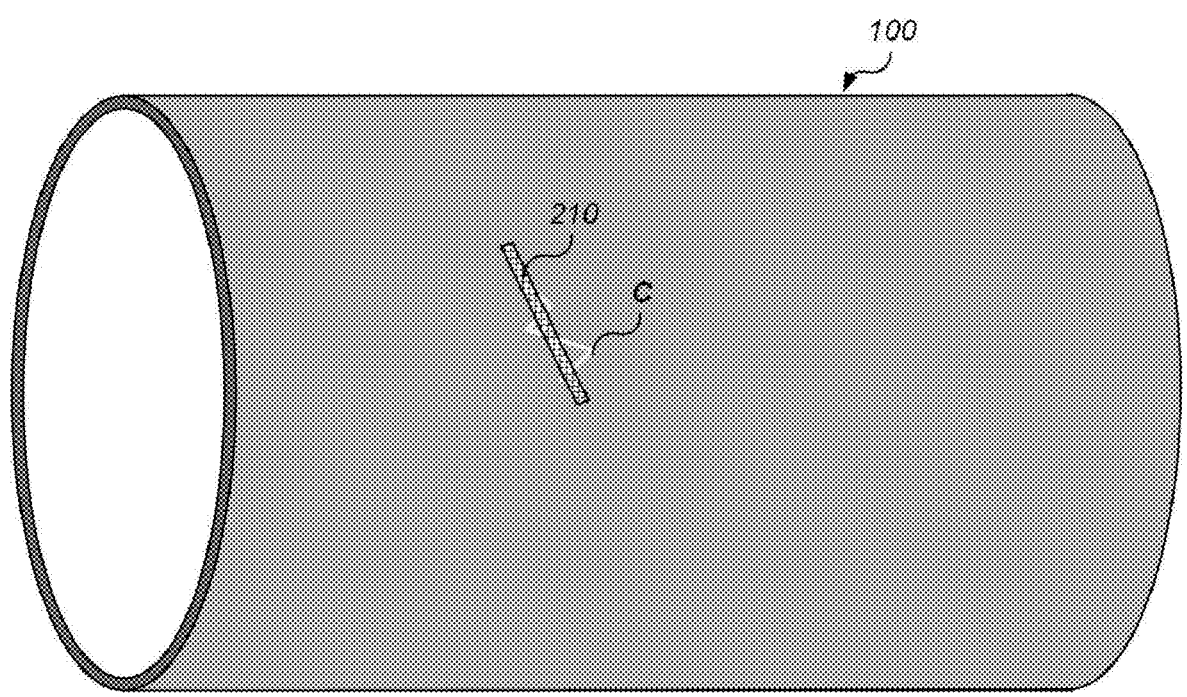

Next, as illustrated in FIG. 13b, a crack growth prevention material 210 is inserted into the crack part C of the UHPC vacuum tube segment 100 in a direction perpendicular thereto to prevent growth of the crack (S120). Here, the crack growth prevention material 210 may be a carbon fiber textile.

Figure 13C:
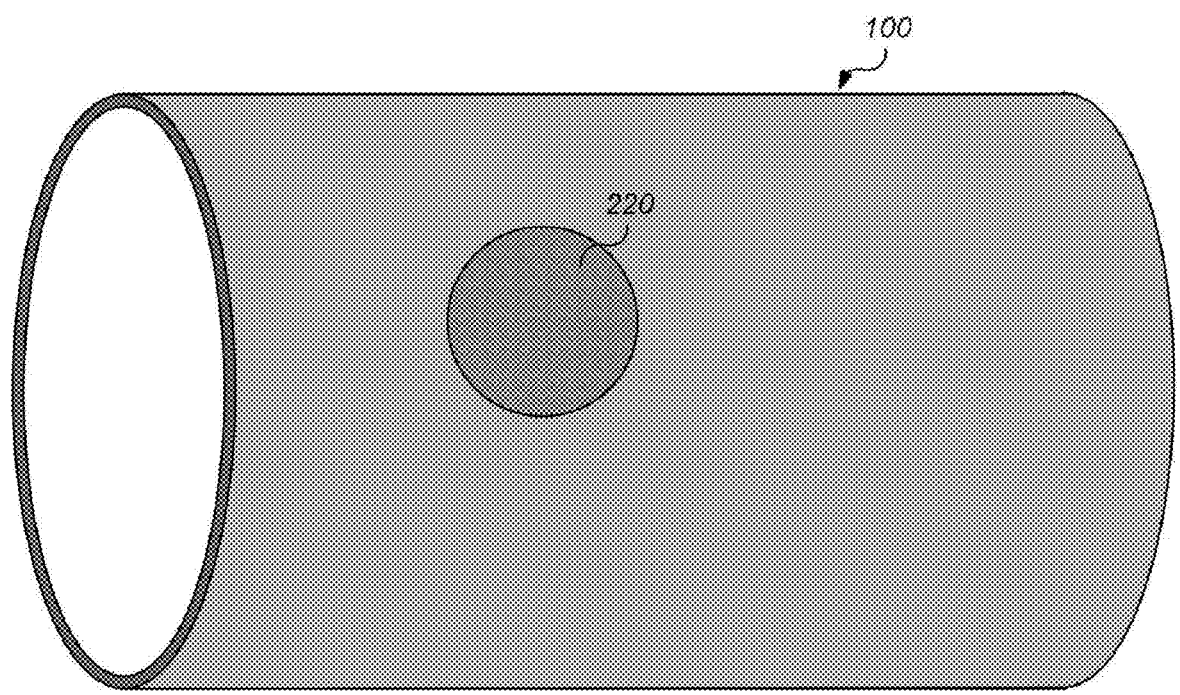

Next, as illustrated in FIG. 13c, a patch repair material 220, which includes a textile reinforcement material 221, an adhesive 222, and a capsule-type crack healing material 223, is attached to the crack part C in the UHPC vacuum tube segment 100 (S130). Here, the textile reinforcement material 221 of the patch repair material 220 may be a 3D coil textile made of a polypropylene material, and the adhesive 222 of the patch repair material 220 may be an adhesive made of a latex material. Also, the capsule-type crack healing material 223 of the patch repair material 220 may include a microcapsule and a polymer matrix, and a microcapsule that has methacrylate as a core material and poly(urea-formaldehyde) as a capsule film-forming material may be added into the polymer matrix.

Figure 13D:
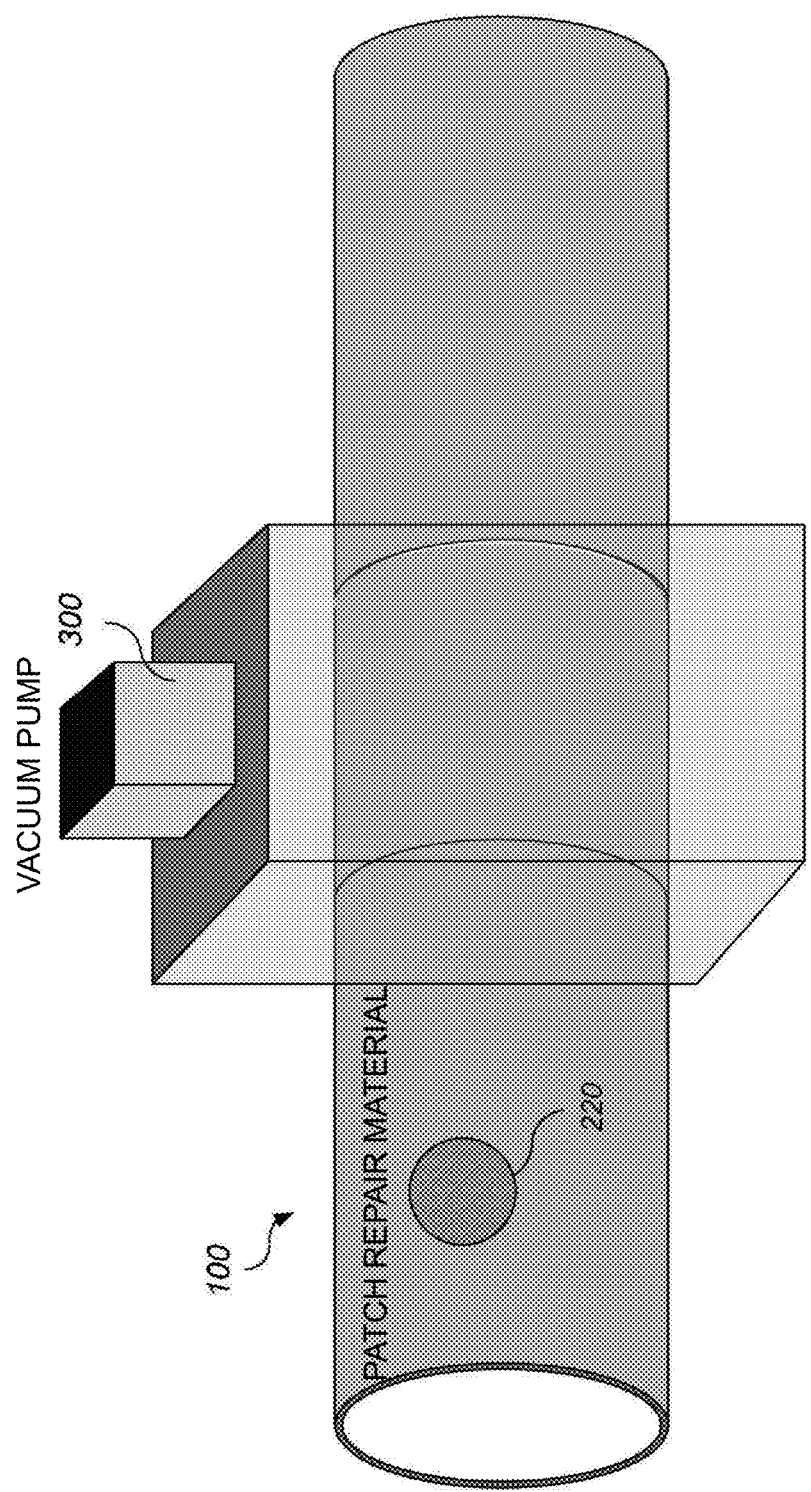

Next, as illustrated in FIG. 13d, when a vacuum pump 300 that causes an interior of the UHPC vacuum tube segment 100 to be in a vacuum or partial-vacuum state is operated (S140), according to vacuum pressure caused by the vacuum pump 300, the crack may be repaired by filling the crack part with the adhesive 222 and the capsule-type crack healing material 223 of the patch repair material 220 (S150).

Consequently, according to an embodiment of the present invention, in a case in which a vacuum tube segment of a hyper-speed transportation system, such as the Hyperloop, is manufactured using UHPC, cracks formed in the UHPC vacuum tube segment may be repaired easily and conveniently using a crack growth prevention material and a patch repair material, and cracks formed in the UHPC vacuum tube segment may be immediately repaired to secure airtightness so that overload of a vacuum pump is prevented. Accordingly, it is possible to prevent shortening of the service life of vacuum pump equipment.

According to the present invention, in a case in which a vacuum tube segment of a hyper-speed transportation system, such as the Hyperloop, is manufactured using UHPC, cracks formed in the UHPC vacuum tube segment can be repaired easily and conveniently using a crack growth prevention material and a patch repair material.

According to the present invention, cracks formed in the UHPC vacuum tube segment can be immediately repaired to secure airtightness so that overload of a vacuum pump is prevented.

The above-given description of the present invention is only illustrative, and those of ordinary skill in the art to which the present invention pertains should understand that the present invention may be modified to other specific forms without changing the technical idea or essential features of the present invention. Therefore, the embodiments described above should be understood as illustrative, rather than limiting, in all aspects. For example, each element described as having a single form may be separated into a plurality of parts and practiced, and likewise, elements described as being separated may be combined and practiced.

The scope of the present invention is shown in the claims below rather than in the detailed description above, and all changes or modifications derived from the meaning and scope of the claims and their equivalents should be interpreted as falling within the scope of the present invention.

What is claimed is:

1. A crack repair material of a concrete vacuum tube segment using ultra-high performance concrete (UHPC) for a hyper-speed transportation system, which is a crack repair material for, in a case in which a vacuum tube segment for a hyper-speed transportation system is formed using UHPC, repairing cracks formed in the UHPC vacuum tube segment, the crack repair material comprising:
   a crack growth prevention material that is inserted into a crack part of a UHPC vacuum tube segment in a direction perpendicular thereto to prevent growth of the crack, wherein the crack growth prevention material is a carbon fiber textile; and
   a patch repair material that includes a textile reinforcement material, an adhesive, and a crack healing material and is attached to the crack growth prevention material on the crack part of the UHPC vacuum tube segment, wherein the crack healing material comprises a microcapsule and a polymer matrix, wherein the microcapsule is added into the polymer matrix, and wherein the microcapsule comprises methacrylate as a core material and poly(urea-formaldehyde) as a capsule film-forming material,
   wherein, when the patch repair material attached to the crack part of the UHPC vacuum tube segment allows a vacuum pump installed for the hyper-speed transportation system to operate, a pressure is generated inside the UHPC vacuum tube segment, and the adhesive and the crack healing material fill the crack according to vacuum pressure to repair the crack in the UHPC vacuum tube segment.

2. The crack repair material of claim 1, wherein the UHPC forming the UHPC vacuum tube segment includes:
   100 parts by weight of cement as a binder;
   20 to 30 parts by weight of silica fume as the binder;
   15 to 25 parts by weight of quartz powder as the binder;
   100 to 120 parts by weight of fine aggregate;
   20 to 28 parts by weight of mixing water;
   4 to 7 parts by weight of a high-performance water reducing agent; and 1.6 to 2.2 parts by weight of an antifoaming agent,
wherein the UHPC is mixed with a short fiber to form a cement composite, and a volume of the mixed short fiber is 1.5 to 2% of the entire volume of the cement composite.

3. The crack repair material of claim 2, wherein the cement composite has a compressive strength in a range of 80 to 180 MPa, a flexural strength of 15 MPa or higher, a direct tensile strength of 7 MPa or higher, a service life of 100 to 200 years, and a shrinkage strain of 700 or lower.

4. The crack repair material of claim 1, wherein the textile reinforcement material of the patch repair material is a 3D coil textile made of a polypropylene material.

5. The crack repair material of claim 1, wherein the adhesive of the patch repair material is an adhesive made of a latex material.

6. The crack repair material of claim 1, wherein, when fine cracks are formed and propagate in a concrete surface, in the crack healing material, the microcapsule placed at a position where the cracks propagate is broken so that a monomer therein flows between crack faces, and the monomer which penetrates into the cracks causes a polymerization reaction due to light so that the cracks self-heal.

7. A method of repairing cracks in a concrete vacuum tube segment using ultra-high performance concrete (UHPC) for a hyper-speed transportation system, which is a method for, in a case in which a vacuum tube segment for a hyper-speed transportation system is formed using UHPC, repairing cracks formed in the UHPC vacuum tube segment, the method comprising:
   a) identifying a crack formed in a UHPC vacuum tube segment for the hyper-speed transportation system;
   b) inserting a crack growth prevention material into a crack part of the UHPC vacuum tube segment in a direction perpendicular thereto to prevent growth of the crack, wherein the crack growth prevention material is a carbon fiber textile;
   c) attaching a patch repair material, which includes a textile reinforcement material, an adhesive, and a crack healing material, to the crack growth prevention material on the crack part in the UHPC vacuum tube segment, wherein the crack healing material comprises a microcapsule and a polymer matrix, wherein the microcapsule is added into the polymer matrix, and wherein the microcapsule comprises methacrylate as a core material and poly(urea-formaldehyde) as a capsule film-forming material;
   d) operating a vacuum pump that causes an interior of the UHPC vacuum tube segment to be in a vacuum or partial-vacuum state; and
   e) according to vacuum pressure caused by the vacuum pump, repairing the crack by filling the crack part with the adhesive and the crack healing material of the patch repair material.

8. The method of claim 7, wherein the textile reinforcement material of the patch repair material is a 3D coil textile made of a polypropylene material.

9. The method of claim 7, wherein the adhesive of the patch repair material is an adhesive made of a latex material.

10. The method of claim 7, wherein, when fine cracks are formed and propagate in a concrete surface, in the crack healing material, the microcapsule placed at a position where the cracks propagate is broken so that a monomer therein flows between crack faces, and the monomer which penetrates into the cracks causes a polymerization reaction due to light so that the cracks self-heal.

* * * * *